May 12, 1942. H. G. M. FISCHER ET AL 2,282,514
PRODUCTION OF COLOR STABILIZED PETROLEUM OILS
Filed July 26, 1939 3 Sheets-Sheet 1

Herbert G. M. Fischer
Willem James  Inventors
By J. C. Small  Attorney

May 12, 1942. H. G. M. FISCHER ET AL 2,282,514
PRODUCTION OF COLOR STABILIZED PETROLEUM OILS
Filed July 26, 1939 3 Sheets-Sheet 2

Herbert G. M. Fischer
Willem James Inventors
By J. K. Small Attorney

May 12, 1942.   H. G. M. FISCHER ET AL   2,282,514
PRODUCTION OF COLOR STABILIZED PETROLEUM OILS
Filed July 26, 1939   3 Sheets-Sheet 3

Patented May 12, 1942

2,282,514

UNITED STATES PATENT OFFICE 2,282,514

PRODUCTION OF COLOR STABILIZED PETROLEUM OILS

Herbert G. M. Fischer, Westfield, N. J., and Willem James, Palembang, Sumatra, Dutch East Indies, assignors of three-fourths to Standard Oil Development Company, a corporation of Delaware, and one-fourth to Socony-Vacuum Oil Company, Incorporated Application July 26, 1939, Serial No. 286,548

3 Claims. (Cl. 196—42)

The present invention relates to the production of color stabilized petroleum products. It especially relates to the manufacture of color stabilized light oil fractions such as naphthas, kerosenes, Varsols, cleaning naphthas, and the like. In accordance with the present process color stabilized petroleum products are produced by treating petroleum oils in an initial stage with an iron oxide under conditions adapted to produce maximum colorization of the oil, followed by subjecting the oil in a subsequent stage to a treatment, preferably distillation, in order to remove the color bodies from the oil.

It is well known in the art that mineral oils, particularly petroleum oils, after refining are subject to deterioration in a manner that they go off color or become colored. This is probably caused by the polymerization of various constituents of the oil to form dyes. Certain oils, particularly the lighter petroleum fractions, are more sensitive to this form of deterioration than other oils. Furthermore, the deterioration is aggravated when the petroleum fractions are stored for extended periods, particularly in warm climates, thus creating difficulties in the storing, shipping, and marketing of these products. Various methods have been proposed and tried in an effort to prevent deterioration and loss of the oil in this manner. For example, one method has been to store the oil for a certain period of time and then to re-run or re-distill the oil to remove color bodies which form. Another method employed is to add so-called color stabilizers or color inhibitors to the oil. Off color oils have also been treated with catalysts and various metallic compounds in an effort to remove color bodies and to secure a color stable product. The use of relatively large quantities of iron oxide is also known as an adsorbent for the removal of color bodies from oil. This process has not been commercially successful due to the large amount of ferric oxide necessary and to other inherent operating difficulties.

Figure 1:
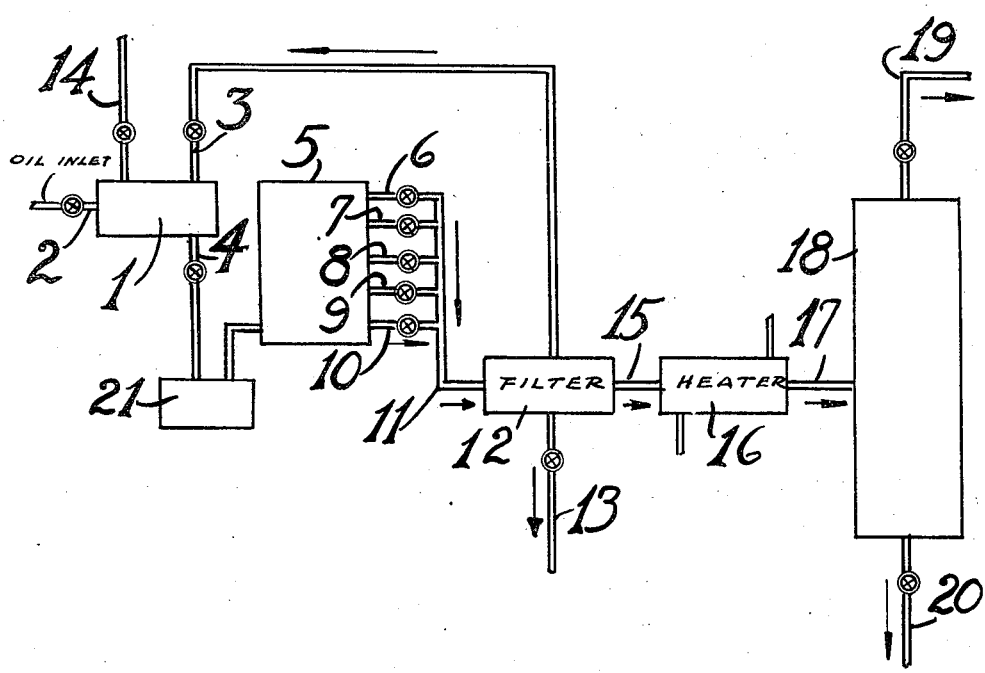
Figure 2:
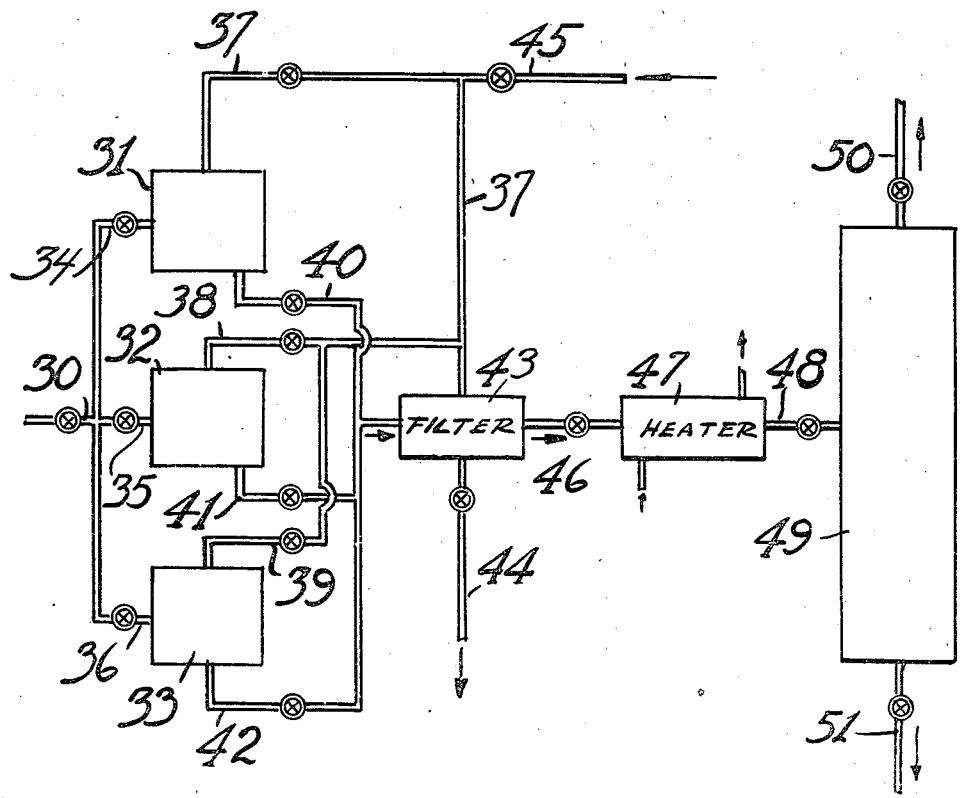
Figure 3:
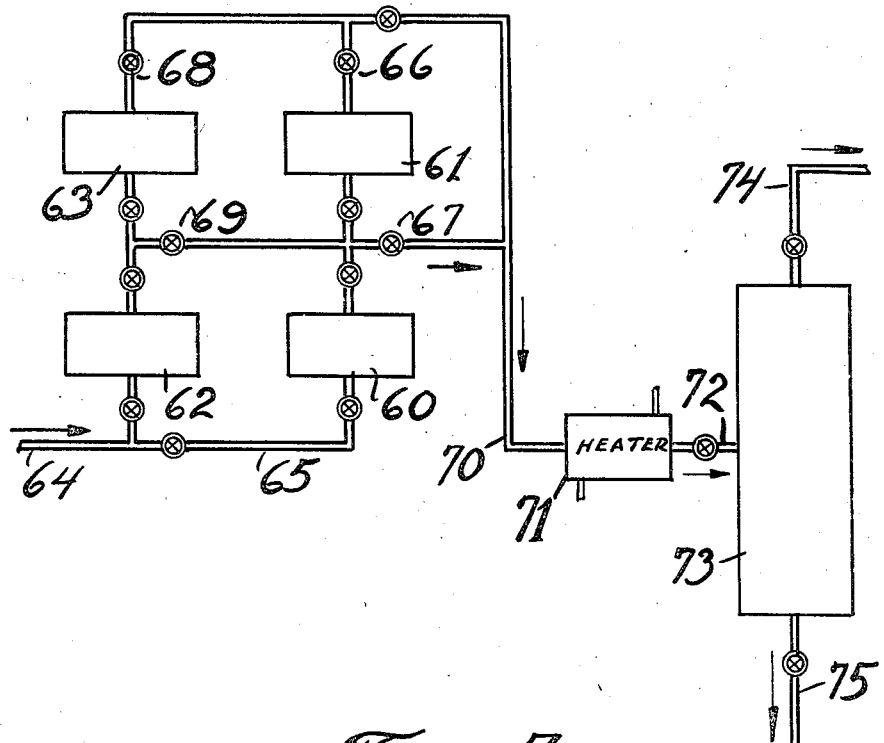

We have now discovered a process by which it is possible to cheaply and efficiently produce a color stabilized product. The process of our invention uses a minimum critical amount of an iron oxide to produce a maximum colorization of the oil, followed by the removal of the iron oxide and color bodies from the color stabilized product. The process of our invention may be readily understood by reference to the attached diagrammatical drawings illustrating preferred modifications of the same. Figure 1 illustrates a continuous process by which it is possible to govern the concentration of the iron oxide, the temperature, and the time of contact between the iron oxide and the oil. Figure 2 illustrates another modification of our invention by which it is possible to control the critical factors of temperature, iron oxide concentration in the oil, and time of contact between the oil and the iron oxide. Figure 3 illustrates a further modification of our invention by which it is possible to control the above mentioned critical factors in a process in which the oil is passed through beds of iron oxide.

Referring specifically to Figure 1, it may be seen that petroleum oil is introduced into mixer 1 by means of feed line 2. In mixer 1 the oil is mixed with an iron oxide which is introduced by means of line 14. The mixture is withdrawn from mixer 1 by means of line 4 and introduced into time contacting tank 5. The mixture may be raised to an optimum temperature by means of heating unit 21. Time contacting tank 5 may also be provided with suitable heating and insulating means to secure and maintain an optimum temperature. Suitable agitating and mixing means likewise may be employed in time contacting tank 5. The mixture is withdrawn from tank 5 by one of the draw-off lines 6, 7, 8, 9, and 10 and introduced into filter 12 by means of line 11. The particular draw-off line chosen will depend upon the length of time it is desired to contact the particular oil with the iron oxide. It is to be understood that the contacting time likewise may be readily varied by adjusting the feed line. The iron oxide is withdrawn from filter 12 by means of line 3 and re-introduced into mixer 1. It may be desirable on occasions to withdraw the iron oxide from filter 12 by means of line 13 and to revivify the same. Revivified or additional iron oxide may be introduced into the system by means of line 14. The oil of a maximum color density is withdrawn from filter 12 by means of line 15 and introduced into heater 16 where the temperature of the oil may be raised to any desirable degree. The heated oil is then introduced into distillation

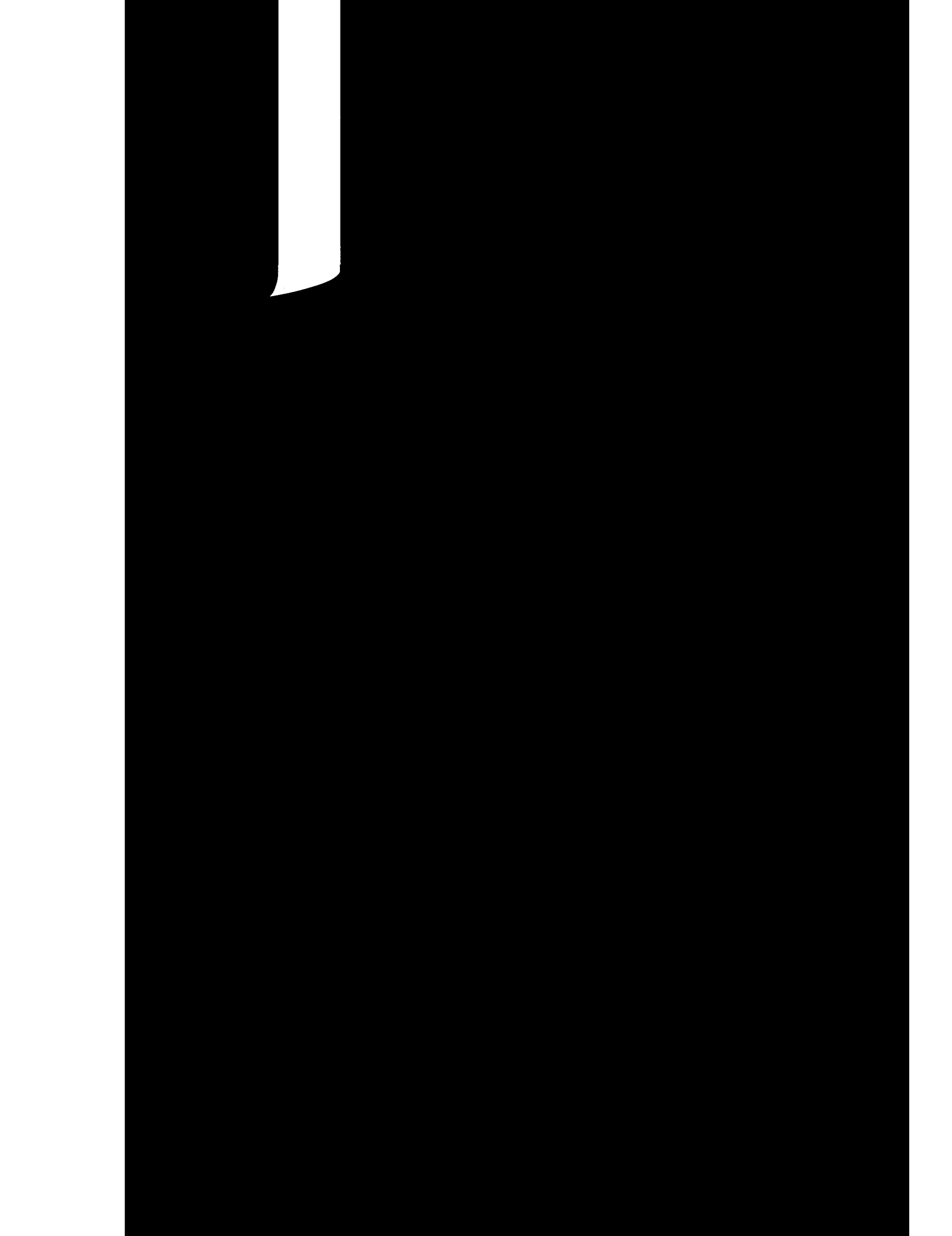

ods of time. The results of these tests are summarized as follows:

Table 1

| Operation number | Grams of Fe$_2$O$_3$ used | ½ hour | | 1 hour | | 1½ hours | | 2 hours | |
|---|---|---|---|---|---|---|---|---|---|
| | | Sayb. color after test | Color increase absolute units | Sayb. color after test | Color increase absolute units | Sayb. color after test | Color increase absolute units | Sayb. color after test | Color increase absolute units |
| 1 | 0.25 | 9 | 4.83 | 10 | 4.46 | 0 | 7.50 | 5 | 5.78 |
| 2 | 0.50 | 8 | 5.04 | 0 | 7.50 | 0 | 7.50 | −11 | 12.59 |
| 3 | 1.00 | −3 | 9.10 | −9 | 11.50 | −16 | 16.50 | −16 | 16.50 |
| 4 | 2.50 | 0 | 7.50 | 0 | 7.50 | −1 | 7.97 | −2 | 8.50 |
| 5 | 5.00 | 12 | 3.86 | 16 | 2.70 | 15 | 2.93 | 16 | 2.70 |
| 6 | 10.00 | 19 | 1.61 | 20 | 1.36 | 21 | 1.16 | 21 | 1.16 |
| 7 | 20.00 | 21 | 1.16 | 22 | 0.93 | 21 | 1.16 | 20 | 1.36 |

From the above data it is readily apparent that there exists a critical quantity of iron oxide which will produce the maximum colorization of the oil. It is to be particularly noted that this critical quantity at a temperature of 212° F. lies between 0.50 and 2.50 grams of ferric oxide. It also should be noted that the maximum colorization was produced at a contact time period of from one hour to one and one-half hours. Upon subsequent distillation of the oil treated in the above described manner, it was found that the distilled oil was entirely stable and that further colorization was not secured by additional treatment with iron oxide.

The results of operations 4, 5, 6, and 7 indicate that the iron oxide is probably effective as an adsorbent in removing the color bodies from the oil. This is entirely undesirable for the production of a color stabilized oil in accordance with the process of the present invention since an unduly large quantity of iron oxide would be required. Furthermore, a large quantity of iron oxide would have to be treated periodically to remove the adsorbed color bodies. It would materially increase operating cost and thus render the process impractical from a commercial viewpoint.

EXAMPLE 2

The iron oxide removed from operation No. 7 in Example 1 was carefully extracted with chloroform. In this manner, 120 mg. of a dark brown viscous material were obtained from the 20 grams of iron oxide used. This viscous material was found to be quite soluble in naphtha and produced a greenish yellow color. Thus from these data, it is evident that the color bodies fouled on the reagent and that it is undesirable and uneconomical to use a quantity of iron oxide above the critical quantity producing maximum colorization of the oil.

EXAMPLE 3

A sample of 500 cc. of a kerosene (0.5 absolute color units) was mixed with 40 grams of iron oxide and blown with air from a short period. To one-half of this treated sample was then added one gram of iron oxide and the treatment with air was repeated. A sample of the original oil (250 cc.) was now treated with one gram of iron oxide and air just as in the second treatment above, that is to say the re-treatment. The results of these three tests are shown in the following samples 1, 2, 3, and 4:

Table 2

| Samples | Color absolute units |
|---|---|
| (1) Original oil color | 0.5 |
| (2) Original after treatment with 40 grams iron oxide | 1.66 |
| (3) Original after treatment with 1 gram iron oxide | 17.00 |
| (4) Sample 2 after re-treatment with 1 gram iron oxide | 4.42 |

The above tests show that the maximum depth of color (17 units) was produced by treating the original oil with one gram of iron oxide. The sample treated with 40 grams had a color depth of 1.66 units. Upon re-treatment of this material with one additional gram of iron oxide, the color depth increased to 4.42 units. These data further indicate the desirable results secured by the process of treating with the critical quantity of iron oxide, followed by removal of the iron oxide and further removal of the color bodies.

Under certain conditions it may be desirable to remove the color bodies from the petroleum oil by methods other than distillation, as for example, by clay filtering and the like. The present invention may be used in conjunction with other known treatment steps, but is of the greatest value in the treatment of low sulfur oils which do not require substantial quantities of an acid. The method is not to be limited to any theory of the reactions involved in either of the steps, nor to any particular agents nor methods of contacting the treatment, but only by the following claims in which it is desired to claim all novelty inherent in the invention.

We claim:

1. Process of producing color stabilized light petroleum oils from hydrocarbon oils comprising subjecting said oil to contact with air while in the presence of 3 to 5 grams of iron oxide consisting of Fe$_2$O$_3$ per 1000 cc. of oil at a temperature in the range from 200° F. to 350° F., removing the iron oxide from the colored oil without removing substantial amounts of color bodies, and then separating the color bodies from the oil by distillation.

2. A method of treating hydrocarbon oils to produce color stabilized hydrocarbon oils which comprises mixing the oil in the presence of air with iron oxide in a proportion of about 3 to 5 grams of iron oxide consisting of Fe$_2$O$_3$ to about 1000 cc. of oil at a temperature in the range from about 200° F. to about 350° F., maintaining the mixture at the desired temperature for about 30 minutes to about 90 minutes to secure substantially maximum colorization of the oil and minimum adsorption of color bodies on the iron oxide, separating the colored oil from the iron oxide without removing substantial amounts of color bodies from the colored oil, and then treating the separated colored oil to separate color bodies from the colored oil to produce a color stabilized oil.

3. A method according to claim 2 wherein the separated iron oxide is used over again in another treating step for stabilizing petroleum oil without revivifying or regenerating the iron oxide.

HERBERT G. M. FISCHER.
WILLEM JAMES.